United States Patent Office 2,901,464
Patented Aug. 25, 1959

2,901,464

DIOXO-BIS-GUANAMINES AND RESINS THEREFROM

Frederic C. Schaefer, Darien, and Leo A. Landers, Stamford, Conn., assignors to American Cyanamid Company, New York, N.Y., a corporation of Maine No Drawing. Application December 28, 1955
Serial No. 555,799

11 Claims. (Cl. 260—67.6)

This invention relates to bis-guanamines, to polymers therefrom and to methods for preparing them. More particularly, it relates to substituted dioxo-bis-guanamines represented by the formula:

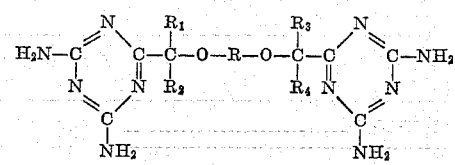

where $R_1$, $R_2$, $R_3$, and $R_4$ are the same or different hydrogen or lower alkyl radicals and R is a (lower) alkylene, or a (lower) alkylidene, or a (lower) alkylidene diphenyl radical, such as for example, methylene, ethylene, propylene, butylene, pentylene, ethylidene, propylidene, butylidene and isopropylidene diphenyl.

It is an object of the present invention to prepare a new and novel class of the aforementioned substituted dioxo-bis-guanamine compounds. It is a further object to present new and novel storage-stable resins prepared therefrom.

In the past, bis-guanamines which lack a substituted diether linkage have been reacted with formaldehyde to form resins. Such resins unfortunately tend to harden or cure upon standing. Frequently, it is desired to prepare a storage-stable resin syrup which does not harden upon standing and yet cures rapidly when needed. This objective has been successfully attained in the use of the novel class of dioxo-bis-guanamines mentioned above. Unexpectedly, a storage-stable resin syrup which can be rapidly cured, is prepared from the latter class of compounds upon reaction with a formaldehyde solution.

In general, the dioxo-bis-guanamines of the present invention may be prepared by reacting dicyandiamide with an appropriate dinitrile in the presence of an inert organic solvent. Some illustrative dinitriles are:

α,α'-Ethylidenedioxy bisacetonitrile
Bis-1-cyanoethyl acetal
Bis-1-cyanoethyl formal
1,4-bis(cyanomethoxy)butane
1,3-bis(cyanomethoxy)-2,2-dimethylpropane
2,5-bis(cyanomethoxy)pentane
1,4-bis(1-cyanoethoxy)butane
2,2-bis(4-cyanomethoxyphenyl)propane
Bis-cyanomethyl acetal
Bis-cyanomethyl formal The above listed illustrative dinitriles may be readily prepared by methods known to the art. For example, the α,α'-alkylidenedioxy dinitriles can be prepared by condensing an appropriate aldehyde or acetal with an α-cyanohydrin as disclosed in U.S. Letters Patent 2,398,757.

In accordance with the process of the present invention, a dinitrile of the type illustrated above reacts with a slight molar excess of dicyandiamide, preferably in the presence of an alcoholic potassium, sodium, or lithium hydroxide solution. The reaction is further advantageously conducted in the presence of an inert organic solvent, such as a glycol ether as for example ethylene glycol monomethyl ether, or alcohols such as propanol or butanol. Novel bis-guanamines are thus produced which contain two bridging ether groups in the side chain of the bis-guanamine molecule.

The reaction is carried out at temperatures ranging from 20° C. to about 200° C. It has been found that temperatures below about 75° C. are commercially unsuitable because the rate of reaction is quite slow. However, the rate of reaction increases as the temperature is increased. While the rate of reaction is rapid above 150° C., the yield of desired bis-guanamine is substantially decreased due to side reactions. A good practice therefore is to conduct the reaction at temperatures between 75° C. and 150° C.

In order to facilitate a further understanding of the invention, the following examples are given primarily for purposes of illustrating certain more specific details thereof. The scope of the invention is not to be deemed limited thereby except as defined in the claims. Unless otherwise stated, the parts given are by weight.

EXAMPLE 1

*Preparation of α,α'-ethylidenedioxybisacetoguanamine*

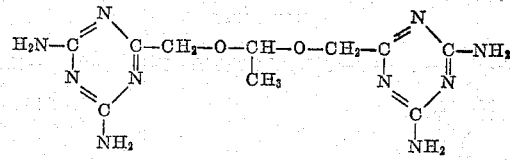

40 parts of α,α'-ethylidenedioxybisacetonitrile, 52 parts of dicyandiamide, 3 parts of potassium hydroxide and 120 parts of butanol are successively added to a reaction flask and heated at about 105° C. for one hour. The reaction flask is then cooled to approximately 22° C. Next, the crystalline solids content in the flask is recovered by filtration and the filtrate is discarded. The solids content is washed with methanol and then with water. The product is dried at about 100° C. A 77% yield, based upon theoretical α,α'-ethylidenedioxybisacetoguanamine whose decomposition point is 260° C., is obtained. The product can be recrystallized from water. So-recrystallized product melted at 272° C.–274° C. analyzing as follows:

Calc'd for $C_{10}H_{16}N_{10}O_2$: 38.9%, C; 5.4%, H; 45.4%, N. Found: 39.1%, C; 5.5%, H; 45.1%, N.

EXAMPLE 2

*Preparation of α,α'-ethylidenedioxybispropioguanamine*

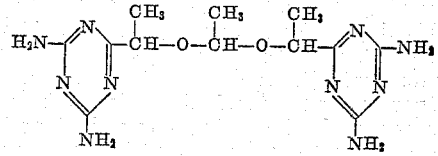

A mixture of 93.5 parts bis-1-cyanoethyl acetal, 102.4 parts dicyandiamide, 5 parts of potassium hydroxide pellets and 240 parts of butanol is heated to 80° C. in a reaction vessel. At that temperature, a mildly exothermic reaction begins. This causes the temperature to rise slowly to about 115° C. where it is maintained by gentle cooling. After the exothermic reaction has subsided, the reaction mixture is diluted with an additional 160 parts of butanol and is heated under reflux for one hour. The reaction vessel is cooled to room temperature. The solids content in the flask is filtered and washed with methanol followed by a water wash. After drying at 110° C., the crude product is recovered in a 92% yield and has a melting point of 272° C.–274° C. (dec.). Recrystallization from 50% aqueous 2-methoxyethanol results in increasing the ethylidenedioxypropioguanamine's melting point to 278° C.–279° C. (dec.).

EXAMPLE 3

*Preparation of α,α'-methylenedioxybispropioguanamine*

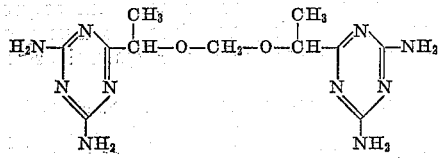

A mixture of 3.5 parts of bis-1-cyanoethyl formal, 5.0 parts of dicyandiamide, 0.5 part of potassium hydroxide, and 7 parts of ethylene glycol monomethyl ether is heated at reflux for 10 minutes. The reaction mixture is then filtered hot with the aid of additional quantities of ethylene glycol monomethyl ether to recover methylenedioxybispropioguanamine. The product is washed with methanol followed by a water wash. Crude product is found to melt at 235° C. Recrystallization of the crude product from a 50% 2-methoxyethanol-water mixture results in a substantial increase in its melting point to 286° C.–290° C. and analyzes as follows:

Calc'd for $C_{11}H_{18}N_{10}O_2$: C, 40.99%; H, 5.63%. Found: C, 40.90%; H, 5.56%.

EXAMPLE 4

*Preparation of α,α'-tetramethylenedioxybisacetoguanamine*

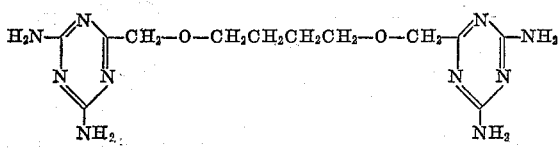

Into a reaction flask is added 284 parts 1,4-(bis cyanomethoxy)butane to a stirred mixture of 298 parts dicyandiamide, 14 parts potassium hydroxide and 96 parts butanol. However, the dinitrile [1,4-(bis cyanomethoxy) butane] is added over a 20 minute interval to the mixture while maintaining the temperature at 115° C. The mixture is refluxed for an additional hour. The reaction vessel is then cooled to room temperature. The crystalline solids content is recovered by filtration. Water washing removes the slightly developed color in the solid dioxo-bis-guanamine. The latter is next dried at about 100° C. A 94% yield is obtained. The melting point of the dioxo-bis-guanamine is 270° C.–275° C.

EXAMPLE 5

*Preparation of α,α'-neopentylenedioxybisacetoguanamine*

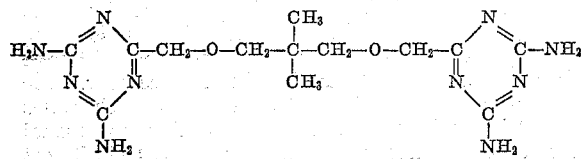

The procedure of Example 3 is repeated except that the dinitrile is 1,3-bis(cyanomethoxy)-2,2'-dimethylpropane. The latter dimethylpropane is characterized by a boiling point of 146° C.–148° C. at 5 mm. Hg pressure and its index of refraction, $n_D^{25}$, is 1.4354. The bisguanamine so-obtained is recovered in good yield (80.5%) and has a melting point of 230° C.–232° C.

EXAMPLE 6

*Preparation of 1,3-dimethyl-1,3-trimethylenedioxybis-(acetoguanamine)*

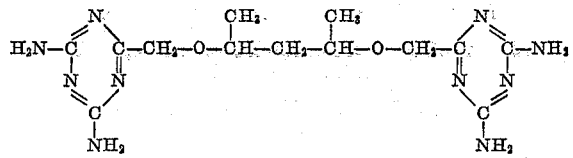

In the manner of the process set forth in Example 2, 2,5-(bis cyanomethoxy)pentane is reacted with dicyandiamide to give 85% yields of 1,3-dimethyl-1,3-trimethylenedioxybisacetoguanamine, whose melting point is 250° C.–252° C. and analyzing as follows:

| | Percent C | Percent H |
|---|---|---|
| Calc'd for $C_{13}H_{22}N_{10}O_2$ | 44.56 | 6.33 |
| Found | 44.29 | 6.51 |

EXAMPLE 7

*Preparation of α,α'-tetramethylenedioxybis(propioguanamine)*

Repeating the procedure of Example 4, the reaction of 1,4-bis(1-cyanoethoxy)butane with dicyandiamide under the conditions described therein. A 94% yield of bisguanamine having a melting point of 270° C.–275° C. is obtained.

EXAMPLE 8

*Preparation of 4,4'-isopropylidenebis(α-phenoxyacetoguanamine)*

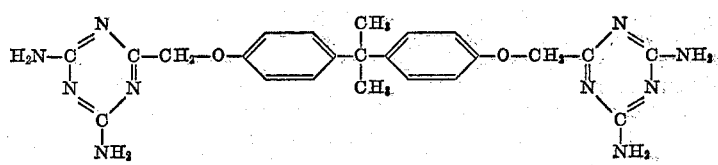

The procedure of Example 3 is repeated except that 2,2-bis(4-cyanomethoxyphenyl)propane reacts with dicyandiamide to give a good yield of 4,4'-isopropylidenebis(α-phenoxyacetoguanamine).

As previously stated, the bis-guanamines of the present invention are good resin formers. When the bis-guanamines are reacted with aqueous formaldehyde, they form storage-stable syrupy solutions or, if desired, the syrupy solution is de-watered to form a dried resin. In either event, a fast curing but storage-stable material is obtained. The following examples will illustrate the preferred embodiments of this aspect.

EXAMPLE 9

One mol of α,α'-ethylidenedioxybisguanamine prepared by the process of Example 2 is reacted with four mols of formaldehyde in aqueous solution containing 50% solids at a pH of 6.0–7.0 at 100° C. Heating is continued until the clear solution begins to cloud, indicating that the hydrophobic end point has been reached. Heating is then discontinued. Upon cooling, the syrupy product is soluble in 50% alcohol-water mixture. The solution is stable even after 12 weeks of storage and cures up rapidly under acid conditions at pH between 5 and 6.9. A cured film has good color, clarity, and resistance to alcohol and caustic solution. The syrupy resin is further useful as a laminating resin. When the syrupy resin solution is evaporated and the resultant solid pulverized, a non-hygroscopic powder, useful as a laminating resin, is prepared.

EXAMPLE 10

One mol of α,α′-neopentylenedioxybisacetoguanamine, prepared by the process of Example 5, is reacted at 100° C. with about four mols of formaldehyde in aqueous solution containing 50% solids at a pH of between 6 and 7. The mixture is heated until the hydrophobic end point is reached. Heating is then terminated and the hydrophobic product is found to be soluble in 50% alcohol-water mixture. After 12 weeks, the syrup was found to be storage-stable curing rapidly at a pH of from 5–7.

In four separate runs, the products of Examples 1, 3, 4 and 10 were substituted for the product of Example 5 in the procedure set forth in Example 10 above. The syrupy resins formed in each run are found storage-stable and cure rapidly.

We claim:

1. A dioxo-bis-guanamine of the formula:

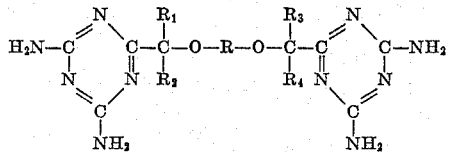

in which $R_1$, $R_2$, $R_3$, and $R_4$ are selected from the group consisting of hydrogen and methyl and R is selected from the group consisting of a lower alkylene, a lower alkylidene and a lower alkylidene diphenyl radical.

2. The monomeric compound α,α′-ethylidenedioxybisacetoguanamine of the formula:

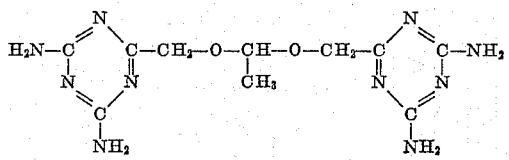

3. The monomeric compound α,α′-ethylidenedioxypropioguanamine of the formula:

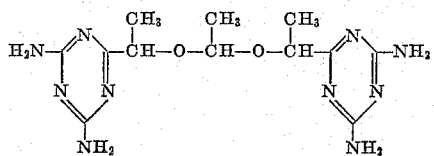

4. The monomeric compound α,α′-methylenedioxybispropioguanamine of the formula:

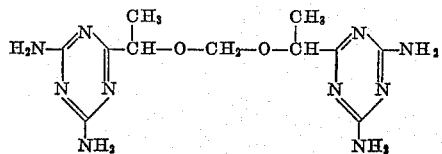

5. The monomeric compound α,α′-tetramethylenedioxybisacetoguanamine of the formula:

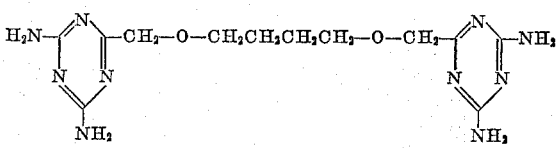

6. The monomeric compound α,α′-neopentylenedioxybisacetoguanamine represented by the formula:

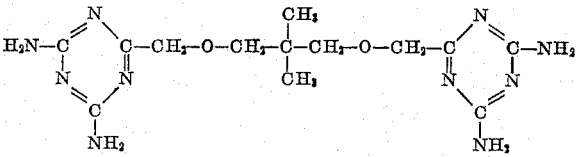

7. A process for preparing the monomeric bis-guanamine of claim 1 which comprises: reacting at a temperature of from about 20° C. to about 200° C. one mole of a dinitrile of the general formula:

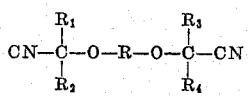

wherein $R_1$, $R_2$, $R_3$, and $R_4$ are selected from the group consisting of hydrogen and methyl radicals and R is a radical selected from the group consisting of lower alkylene, lower alkylidene and diphenyl substituted lower alkylidene with two moles of dicyandiamide.

8. A storage-stable resin syrup prepared by reacting a monomeric bis-guanamine of claim 1 with formaldehyde in a mol ratio of about 1:4 in aqueous solution at 100° C. and at a pH of from 5–7.

9. A storage-stable resin syrup characterized by its fast curing properties prepared by reacting at about 100° C. one mol of α,α′-ethylidenedioxybisacetoguanamine with four mols of formaldehyde in aqueous solution containing 50% solids at a pH between about 6 and 7.

10. A storage-stable resin syrup characterized by its fast curing properties prepared by reacting at about 100° C. one mol of α,α′-neopentylenedioxybisacetoguanamine with four mols of formaldehyde in aqueous solution containing 50% solids at a pH of between 6 and 7.

11. A new and useful polymer prepared by reacting a monomeric bis-guanamine defined in claim 1 with formaldehyde in a mol ratio of about 1:4 in aqueous solution at 100° C. and at a pH of between about 5 and 7; and dewatering resultant syrupy material to obtain a dry storage-stable resin product capable of curing up rapidly.

References Cited in the file of this patent

UNITED STATES PATENTS

| | | |
|---|---|---|
| 2,398,757 | Loder et al. | Apr. 16, 1946 |
| 2,401,607 | Bruson | June 4, 1946 |
| 2,510,761 | Simons | June 6, 1950 |
| 2,653,143 | De Benneville et al. | Sept. 22, 1953 |